Aug. 30, 1938.    C. O. MARSHALL    2,128,491
WEIGHING SCALE
Filed Jan. 31, 1936    3 Sheets-Sheet 1
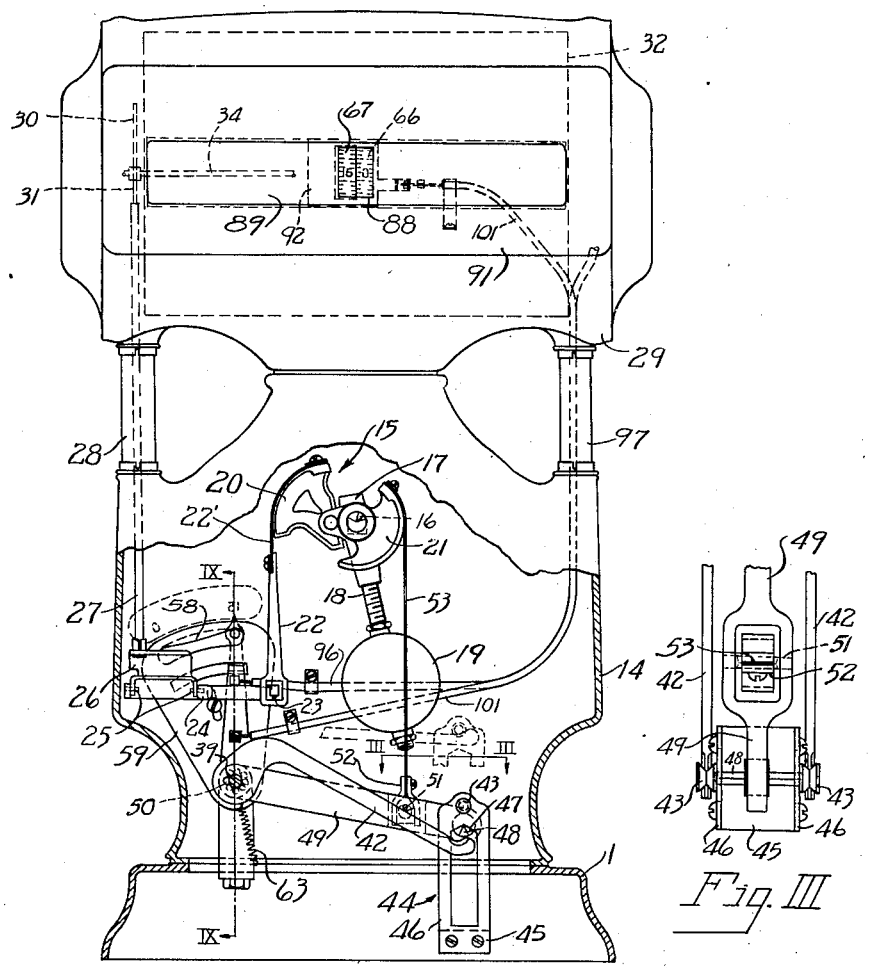
Fig. I
Fig. III
INVENTOR

Aug. 30, 1938.  C. O. MARSHALL  2,128,491
WEIGHING SCALE
Filed Jan. 31, 1936  3 Sheets-Sheet 2
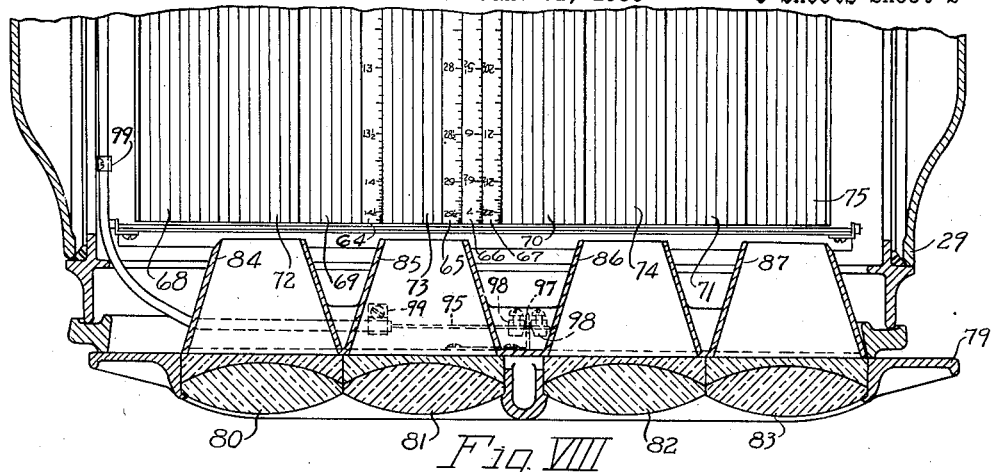
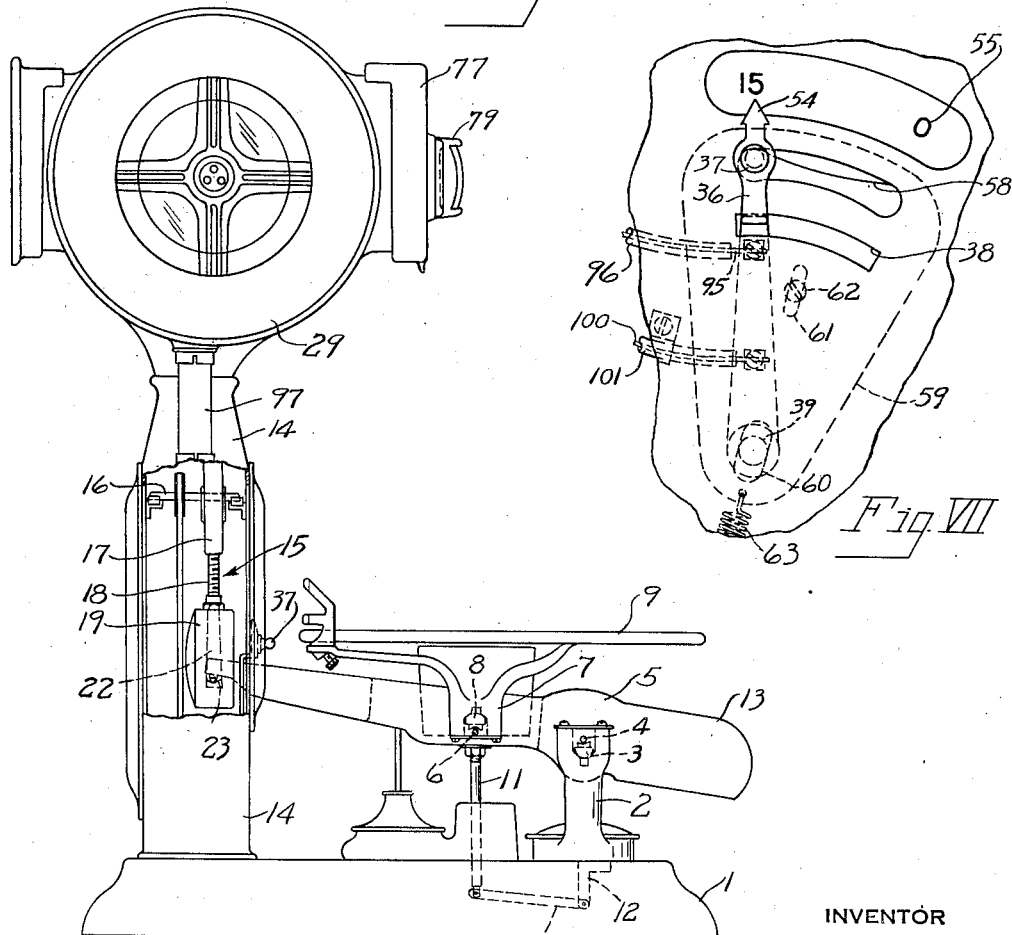
INVENTOR
Charles O. Marshall

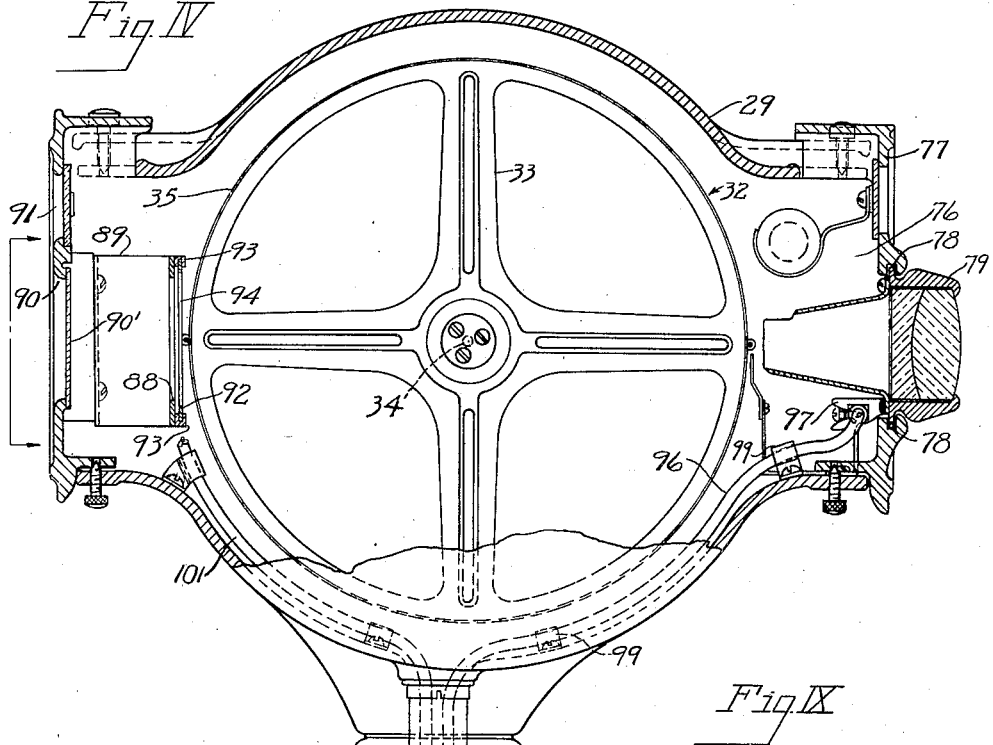
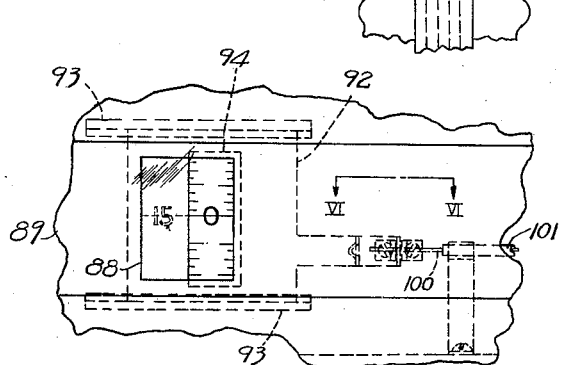
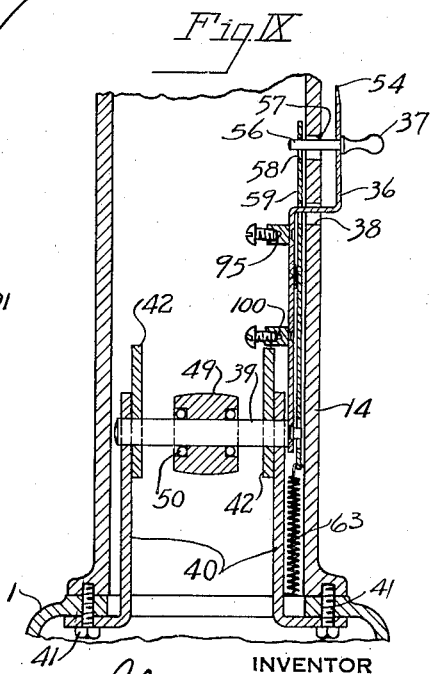
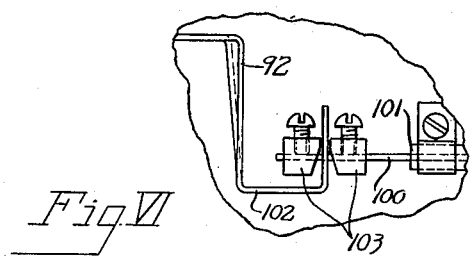

Patented Aug. 30, 1938

2,128,491

UNITED STATES PATENT OFFICE 2,128,491

WEIGHING SCALE

Charles O. Marshall, Toledo, Ohio, assignor to Toledo Scale Manufacturing Company, Toledo, Ohio, a corporation of New Jersey Application January 31, 1936, Serial No. 61,642

4 Claims. (Cl. 265—37)

This invention relates generally to weighing scales, and more specifically to scales having inbuilt means for increasing the weighing capacity.

Heretofore when a capacity increasing mechanism was provided in a price computing scale having a cylindrical chart it was necessary to either limit the rotation of the chart to one-half of its circumference for each weighing capacity and thereby cause the computed value graduations to be spaced so closely as to make it difficult to observe the proper value, or to provide computed values for only a portion of the weighing capacity.

The principal object of my invention is therefore the provision of means whereby computed values may be provided in a scale of the type described for the entire range of the weighing capacity.

Another object is the provision of improved means whereby sets of value computations for a certain weighing capacity may be interspersed with other sets of value computations for another weighing capacity, one of the factors of the computed values being the same for all sets.

A still further object is the provision of improved means in a weighing scale of the type herein referred to in which two sets of computed values on a chart are complementary to each other.

A still further object is the provision of improved means in a scale having a capacity increasing weight causing the indication of the scale to indicate the computed values corresponding to the weighing capacity as influenced by such capacity increasing weight.

These, and other objects and advantages will be apparent from the following description in which reference is had to the accompanying drawings, wherein similar reference characters refer to similar parts throughout the several views.

Referring to the drawings:—

Figure I is an elevational view of the customer's side of the scale embodying the invention, a portion of the housing being broken away to more clearly show the load counterbalancing mechanism.

Figure II is a side elevational view of the scale, a portion of the housing being broken away for a similar reason.

Figure III is a fragmentary sectional plan view of the capacity increasing weight and of portions of its actuating mechanism. The parts are viewed substantially from along the line III—III of Figure I.

Figure IV is an enlarged, end elevational view of the indicating mechanism, parts being broken away to more clearly show my improved operating means.

Fig. V is an enlarged, fragmentary, elevational view of the weight indication on the customer's side of the scale, and its operating means.

Figure VI is an enlarged view of the operating connection, viewed substantially from along the line VI—VI of Figure V.

Figure VII is an enlarged, fragmentary view showing the unit weight operating mechanism and portions of the indication setting means.

Figure VIII is a fragmentary plan sectional view of the value and weight indicating chart, magnifying means and the means for controlling the magnifying means; and, Figure IX is a fragmentary sectional view, substantially along the line IX—IX of Figure I, showing in greater detail the arrangement of the capacity weight supporting lever and capacity weight operating mechanism.

Referring to the drawings in detail:—

A base 1, preferably a rigid metallic casting, has mounted thereon a base horn 2. This base horn is provided with pockets in its upper ends in which bearings 3 are situated. These bearings form seats for fulcrum pivots 4 of the lever 5. To support a load, pivots 6 are fixed in the lever 5, in spaced relation to the pivots 4, these pivots are adapted to be engaged by bearings 8 which are seated in a load supporting frame 7. Platter 9 which rests on arms of the frame 7 serves to receive the loads to be weighed.

To maintain the condition of level of this platter 9, a check link 10 of usual type is provided. This check link is located in the hollow portion of the base 1. One end of the check link pivotally engages a stem 11 which extends downwardly from the frame 7 and the other end of the link 10 pivotally engages a bracket 12 suitably secured to the base so that a "Roverbal parallelogram" is formed. This is well known in the art and requires no further explanation. The dead weights of the parts comprising the load receiving means, including that portion of the lever 5 which extends on one side of the fulcrum pivot 4, that of the load receiver frame 7 and of the load receiving platter 9 are counterbalanced by a weighted portion 13, of the lever 5, which extends on the opposite side of the fulcrum pivot. The weight of this portion is so adjusted that just sufficient "initial" pull is transmitted by the nose of the lever 5, which extends through an opening into the interior of a housing 14, to a load counterbalancing pendulum 15 to float the same when there is no load on the platter 9. The pendulum 15 comprises a pivot 16 fixed into and extending through a pendulum body 17. This pivot 16 is suitably fulcrumed on bearings provided for this purpose in the interior of the housing 14. The pendulum body 17 has studded into it, in a depending position, a stem 18 on which a weight 19 is threaded. A power sector 20, which forms a part of the pendulum, is located so that it extends to one side of the pendulum pivot 16 and, for a purpose which will hereinafter become clear, a second sector 21 extends on the opposite side of the fulcrum pivot; it also being fastened to the pendulum body 17. For the purpose of transmitting the "pull" effected by a load on the platter 9 to the load counterbalancing mechanism the lever nose engages a stirrup 22 with its nose pivot 23 which is fixed therein. The upper end of the stirrup 22 is fastened to the lower end of a flexible metallic ribbon 22' which overlies and is fastened to the upper end of the arcuate surface of the power sector 20. Any movement of the lever 5, caused by placing a load on the platter 9, causes the pendulum 15 to oscillate about its axis which is formed by the pivot 16 and since the angle of movement of the pendulum is in direct proportion to the weight of the commodity on the platter the movement of the pendulum may be taken as indicative of the amount of load. For this purpose, projections on a laterally extending arm 24 of the lever, are provided with pintles 25 on which a rack foot 26 is pivotally mounted. Adjustably fixed in the rack foot 26 is an upwardly extending rod 27. This rod 27 extends through a protector tube 28 into the interior of a substantially cylindrical chart casing 29. The rod 27 is provided with a rack 30 whose teeth are arranged to mesh with teeth of a pinion 31 which is circumjacently mounted on a shaft 34 of a weight and value indicating chart 32. The ends of the chart shaft 34 are mounted in suitable antifriction bearings (not shown) fixed in the ends of the casing 29. The chart 32 is constructed in the usual manner by enveloping a series of chart spiders 33 which are suitably fixed to the chart shaft 34, with a cylinder 35 formed from a light sheet material upon which the weight and computed value indicia are printed. As hereinbefore stated, since the angle which the pendulum traverses, under the influence of a load, is proportional to the weight of such load the chart 32 is rotated, by the cooperation of the rack 30 and pinion 31, through an angle which is also proportional to the weight and thus the weight is accurately indicated by the position of the chart.

The scale thus far described is of the usual construction.

For the purpose of increasing the weighing and indicating capacity of the scale, improved mechanism is provided. This mechanism comprises an operating arm 36 having a grip 37. That portion of the arm 36 to which the grip 37 is attached lies on the exterior of the housing 14. Another portion projects through a slot 38 into the interior of this housing and is riveted to a rock shaft 39 which is fulcrumed in apertures in two bracket-like members 40, bolted to the base 1 by means of the bolts 41. Also securely fixed to the rock shaft 39 are two, spaced apart, weight actuating arms 42. These arms 42 extend transversely of the axis of the shaft, in the exterior of the housing 14, and are adapted to engage outwardly projecting spool-like members 43 of a unit weight 44 which the actuating levers straddle. The unit weight consists of a body 45 and frames 46 which are screwed to opposite ends of the body. Longitudinal slots in these frames 46 terminate in a V bearing 47, adapted to rest on a pivot 48, extending through a lever 49 which by means of antifriction ball bearings 50 is fulcrumed on the shaft 39. A pivot 51, extending across a bifurcated portion of the lever 49, engages a stirrup 52 which is suspended from the lower end of a flexible metallic ribbon 53 whose upper end overlies and is fastened to the arcuate face of the sector 21 forming a part of the load counterbalancing pendulum 15.

The capacity weight 44 normally is suspended by the spool-like projections 43 from the operating arms 42. When so disposed, the capacity weight does not add to the weighing capacity of the scale, this position is indicated by the dotted lines in Figure I. The operating arm 36 with its index 54 then points to the zero character 55 (see Figure VII).

To firmly retain the arms 42, either in their upper or their lower position, a self-acting locking means is provided. This consists of a pin 56 studded into the operating arm 36 and projecting through a slot 57 in the housing 14 and into another slot 58 in a lock plate 59. The lock plate 59 is slidably mounted in the housing. It has a pair of aligned slots 60 and 61, which receive the rock shaft 39 and a flat headed screw 62 respectively. This screw 62 also serves to retain it against the inner wall of the housing 14. The transverse slot 58 in the plate 59 is formed in its upper wall with a "hump", serving to divide the slot into two pockets thereby preventing the pin 56 from accidentally moving in this transverse slot except when force is applied to the grip 37 of the arm 36, such force causes the plate to be lifted against tension of a spring 63 which is hooked into the bottom of the lock plate 59 and whose lower end is fastened to the base. When the pin 56 passes over the "hump", the spring 63 again pulls the plate 59 into its lowermost position and holds the operating arm 36 against accidental movement.

The weight and value indicating means comprise the cylindrical chart 32 which bears two sets of weight indicating columns 64, 65 and 66, 67. The column 64 indicates, to the merchant, the weight of the commodity on the platter 9 when the weighing capacity of the scale is not influenced by the capacity weight 44 and similarly the column 65 indicates the weight of commodity when the capacity weight 44 is cooperating with the load counterbalancing pendulum to increase its load offsetting effect. The columns 66 and 67 respectively indicate the same result, under similar conditions, to the customer on the opposite side of the scale. The sets 68, 69, 70 and 71 of computed values are related to the weight columns 64 and 66 and the sets 72, 73, 74 and 75 of computed values are calculated with the weights indicated by the weight columns 65 and 67 as factors. It will be seen that the computed values for the higher capacity of the scale when influenced by the weight 44 are interspersed among the value columns for the lower weighing capacity of the scale. The reason for this will become apparent. The chart casing 29 is provided with an opening 76 which extends across the entire width of the chart. This is covered by a plate 77 provided with ways 78 in which a lens frame 79 is slidably mounted. A series of spherical magnifying lenses 80, 81, 82 and 83 are seated within a rectangular opening in this lens frame 79. The magnifying power of each of these lenses, at the proper distance from the front of the chart 32, is such that characters on the chart viewed through the lenses are magnified two dimensions both vertically and horizontally. Secured to the rear side of the sliding lens frame 79 is a set of frusto-pyramidal lens cells 84, 85, 86 and 87, each lens cell being positioned directly back of a lens, as shown in Figure VIII, and having an opening in its forward end corresponding substantially to the area of the lens and an opening in its rear end, adjacent the front side of the chart, of substantially one-fourth the area of the lens. Hence the portion viewed through each of the lenses and lens cells is one-half as high and one-half as wide as the face of the lens, but because both its height and its width are magnified two dimensions, the portion of the chart viewed through the lens appears to be substantially co-extensive in area with the lens, and the interior of each lens cell as seen through its lens appears as a rectangular passage, the walls of which appear not to converge but to extend parallel to each other rearwardly from each edge of the lens; thus the adjacent sides of each two lens appear to merge into one thin wall extending directly to the rear and selected spaced apart areas of the chart appear in the lenses to occupy substantially the entire length of the chart. Hence, for each weighing capacity of the chart the corresponding computed values only are visible and they apparently occupy the entire indicating opening.

The indicating means employed in this invention are more fully described in my U. S. Patent 1,973,685 and a description at greater length is therefore deemed unnecessary.

Weight indicating columns 66 and 67, as hereinbefore described, are visible through an opening 88 in a screen 89. This screen 89 is fastened in back of an opening 90 in the plate 91 which closes a substantially larger opening in the casing 29 on the customer's side of the scale. A pane of transparent glass 90' covers the opening 90 to prevent the entrance of dust into the mechanism. The screen 89 which is made from comparatively thin metal has a flat portion which is positioned closely adjacent the surface of the chart 32 and has an opening 88 in this flat portion which overlies the weight columns 66 and 67 on the chart and its width is equal to the combined width of these columns. Since, however, one column only is to be visible at any one time a slide 92 is mounted in guides 93 fastened to the back of the flat portion of the screen 89. An opening 94, whose width is equal to the width of one of the weight columns 66 and 67, is provided in this slide to selectively overlie one of the columns 66 and 67 on the chart 32, permitting only the other to be visible.

Since it is an object to automatically bring the proper weight and value indication into registration, when the capacity weight is placed either on the lever 49 or removed therefrom, a flexible wire 95 is clamped to the operating arm 36 in the interior of the housing 14 and led through a tube 96, which may be formed of spirally coiled wire, through a portion of the housing 14, a protector tube 97 into the casing 29 and in the interior of this casing through an aperture in a bracket 97 which is secured to the sliding lens frame 79. A suitably formed abutment member 98 is clamped to the wire on each side of the bracket 97. Suitable clamps 99 are provided to retain the tube 96 in proper position. A second similar wire 100, clamped to the operating arm 36, extends through a similar tube 101 to the slide 92 where it projects through a suitable formed portion 102 and to which it is retained by clamped abutment members 103.

Let us assume that the automatic weighing capacity of the scale heretofore described is from zero to 15 lbs. and the capacity increasing weight is adapted to double the weighing capacity, that is, from 15 to 30 lbs.; when a load weighing 12 lbs. 4 oz., is placed on the platter 9 its weight depresses the lever 5 and the resulting force is transmitted through the nose pivot 23 through the stirrup 22 and metallic ribbon 22' to the pendulum 15. This, under the action of this force, turns about its pivot 16 and its weight 19 moves outwardly and upwardly until its weight moment balances the load, the chart 32 is revolved through an angle, by the cooperation of the rack 30 which is operatively connected to the lever 5, until the weight column 64 indicates 12 lbs. 14 oz. to the merchant and the weight column 66 the same amount to the customer. The computed value for any amount of commodity up to 15 lbs. is indicated in the usual manner by the computed values in the sets 68, 69, 70 and 71 and may be read with the cooperation of the heretofore described lens system. When a load is to be weighed which is in excess of 15 lbs., it is necessary that the weighing capacity of the scale be augmented by placing the weight 44 on the pivot 48 in the lever 49 which is cooperatively attached to the pendulum 15. This is accomplished by grasping the grip 37 on the arm 36 and moving this in an anticlockwise direction (Figure VII); the pin 56 projecting into the slot 58 in the plate 59 contacts the "hump" and forces this upwardly and the spring 63 retracts this plate when the pin 56 has reached the end of the slot 58 thus retaining it in this position. The actuating levers, which heretofore have held the weight 44 in its uppermost position, free from the pivot 48, have rocked downwardly and have deposited the weight 44 on the pivot 48. Since the lever 49 is freely fulcrumed on the rock shaft 39 and operatively connected to the pendulum 15 by the stirrup and ribbon 53 in opposition to the force exerted by the load on the platform, the force of the weight now resting on the pivot 48 causes the pendulum to turn downwardly and inwardly, returning the chart to the zero position and the scale may now weigh loads up to 30 lbs. Any movement of the operating arm 36 is communicated by the wires 95 and 100, which being flexible slide through the tubes 96 and 101 and cause the lens frame 79 to move to a position where the weight indication in the weight column 65 is visible through the lenses on the merchant's side and the slide 92 on the customer's side is moved so that the opening 94 overlies the weight column 67. The computed values on the sets of computed prices 72, 73, 74 and 75 are now visible through the lenses. Since the amount of movement necessary for the lens frame 79 and for the slide 92 is different to properly fulfill their functions the wires 95 and 100 are clamped to the arm 36 at different distances from its turning point. It will be seen that the embodiment of my invention as herein disclosed is well adapted to fulfill the objects primarily stated. It is to be understood, however, that the invention is susceptible to variation, modification and change within the spirit and scope of the subjoined claims.

Having described my invention, I claim:—

1. In a device of the class described, in combination, weighing mechanism comprising load receiving means, automatic load counterbalancing mechanism and complementary manipulative load offsetting mechanism cooperating with said load receiving means, indicating means comprising a chart having a series of spaced computed value columns for loads offset by said automatic load counterbalancing mechanism, a series of spaced computed value columns for loads offset by the cooperation of said automatic load counterbalancing mechanism and said complementary manipulative load counterbalancing mechanism, the columns of the second said series being interspersed among the columns of the first said series, means including a plurality of spherical lenses for selecting successively value characters relating to loads counterbalanced by said automatic load counterbalancing mechanism and other value characters relating to loads counterbalanced by said manipulative load counterbalancing mechanism, and means controlled by said complementary manipulative load-counterbalancing mechanism for shifting said lenses from before one of said series of columns to before the other of said series of columns.

2. In a device of the class described, in combination, weighing mechanism comprising load receiving means having attached thereto automatic load counterbalancing mechanism, manipulative load-counterbalancing mechanism including a capacity increasing weight adapted to be connected to said automatic load counterbalancing mechanism to influence its load offsetting effect, indicating means actuated by said automatic load offsetting mechanism comprising a rotatable drum, a plurality of spaced sets of computed value columns disposed on said drum, one of said spaced sets of computed value columns being adapted to indicate computed values of loads counterbalanced by said automatic load counterbalancing mechanism, another one of said plurality of sets of computed value columns being adapted to indicate computed value of loads counterbalanced by said automatic load counterbalancing mechanism as influenced by said manipulative load counterbalancing mechanism, the columns of one set being interdisposed among the columns of the other set, means including a plurality of spherical lenses for selecting and making a visional display of one of said sets of computed value columns, and means controlled by said manipulative load-counterbalancing mechanism for shifting said lenses from before one of said sets of columns to before the other of said sets of columns.

3. In a weighing scale, in combination, a load offsetting pendulum, means cooperating with said pendulum for adding to the load offsetting effect of said pendulum, indicating means comprising a cylindrical chart, a plurality of series of computed values disposed on said chart and corresponding to a part of the total weighing capacity of the scale, another plurality of series of computed values interspersed between said first plurality of series of computed values and corresponding to the remainder of the total weighing capacity of the scale, each of said series of computed values occupying distinct alternate areas on said chart, means for operating said pendulum offsetting capacity increasing means, magnifying means cooperating with said indicating chart and means connected to, and actuated by, said operating means, to position said magnifying means, to select one of the plurality of series of computed values.

4. In a weighing scale, in combination, a load offsetting pendulum, means cooperating with said pendulum for adding to the load offsetting effect of said pendulum, indicating means comprising a cylindrical chart, a spaced plurality of series of computed values disposed on said chart and corresponding to a part of the total weighing capacity of the scale, and alternately spaced plurality of series of computed values interspersed between said first plurality of series of computed values and corresponding to the remainder of the total weighing capacity of the scale, means for operating said pendulum load offsetting capacity increasing means, magnifying means cooperating with said indicating chart and means connected to, and actuated by, said operating means, to position said magnifying means, to select one of the plurality of series of computed values, said operating means comprising a stiff, flexible wire, a guide for guiding said wire, said guide comprising a tube of spirally coiled wire.

CHARLES O. MARSHALL.